United States Patent
De Vogel et al.

(10) Patent No.: US 9,768,724 B2
(45) Date of Patent: Sep. 19, 2017

(54) CARRIER STRUCTURE FOR SOLAR PANELS AND METHOD OF PRODUCING SUCH A CARRIER STRUCTURE

(71) Applicant: Esdec B.V., Deventer (NL)

(72) Inventors: Jeroen De Vogel, Gorssel (NL); Vincent De Vogel, Colmschate (NL)

(73) Assignee: Esdec B.V., Deventer (NL)

( * ) Notice: Subject to any disclaimer, the term of this patent is extended or adjusted under 35 U.S.C. 154(b) by 0 days.

(21) Appl. No.: 15/034,883

(22) PCT Filed: Nov. 7, 2014

(86) PCT No.: PCT/NL2014/050775
§ 371 (c)(1),
(2) Date: May 6, 2016

(87) PCT Pub. No.: WO2015/069113
PCT Pub. Date: May 14, 2015

(65) Prior Publication Data
US 2016/0261223 A1    Sep. 8, 2016

(30) Foreign Application Priority Data

Nov. 8, 2013 (NL) ...................................... 2011769

(51) Int. Cl.
*F24J 2/52*    (2006.01)
*H02S 20/23*    (2014.01)
*H02S 20/24*    (2014.01)
*F24J 2/46*    (2006.01)

(52) U.S. Cl.
CPC .............. *H02S 20/23* (2014.12); *F24J 2/5203* (2013.01); *F24J 2/5233* (2013.01); *F24J 2/5239* (2013.01); *F24J 2/5243* (2013.01); *F24J 2/5252* (2013.01); *H02S 20/24* (2014.12); *F24J 2002/467* (2013.01); *F24J 2002/4665* (2013.01);
(Continued)

(58) Field of Classification Search
CPC .. F24J 2/52; F24J 2/5203; F24J 2/5233; F24J 2/5239; F24J 2/5252; H01L 31/042; H02S 20/23
USPC .......................................................... 135/139
See application file for complete search history.

(56) References Cited

U.S. PATENT DOCUMENTS 2,778,370 A  *  1/1957  Chamblee ................ A61H 3/02
                                                                            135/68
4,226,256 A  *  10/1980  Hawley .................. F24J 2/5233
                                                                            126/569
(Continued)

FOREIGN PATENT DOCUMENTS

DE    202005002523 U1    6/2005
EP           2234173 A2    9/2010
(Continued)

*Primary Examiner* — Beth Stephan
(74) *Attorney, Agent, or Firm* — The Webb Law Firm

(57) ABSTRACT

The invention relates to a carrier structure for solar panels. The invention also relates to a beam (3) for use in a carrier structure according to the invention. The invention then relates to a carrier (4,5) for use in a carrier structure according to the invention. The invention furthermore relates to an assembly of at least one carrier structure and at least one solar panel. In addition, the invention relates to a method for producing a carrier structure according to the invention.

26 Claims, 5 Drawing Sheets

(52) U.S. Cl.
CPC ........ *F24J 2002/5213* (2013.01); *Y02B 10/12* (2013.01); *Y02E 10/47* (2013.01)

(56) References Cited

U.S. PATENT DOCUMENTS

| | | | | |
|---|---|---|---|---|
| 4,421,943 A * | 12/1983 | Withjack | ............... | F24J 2/5264 126/569 |
| 4,641,676 A * | 2/1987 | Lynch | .................... | E04H 15/50 135/115 |
| 5,086,798 A * | 2/1992 | Motts | ...................... | A61H 3/00 135/67 |
| 5,452,951 A * | 9/1995 | Peller | ....................... | H05K 7/16 108/6 |
| 5,969,501 A * | 10/1999 | Glidden | .................... | F24J 2/523 320/101 |
| 6,220,995 B1 * | 4/2001 | Chen | ...................... | A63B 21/02 297/175 |
| 6,708,707 B2 * | 3/2004 | Dotterweich | ........... | E04H 15/50 135/131 |
| 7,703,469 B2 * | 4/2010 | Danziger | ................ | E04H 15/50 135/120.3 |
| 7,823,583 B2 * | 11/2010 | Allen | ........................ | F24J 2/16 126/684 |
| 7,849,849 B2 * | 12/2010 | Genschorek | ........... | F24J 2/5233 126/623 |
| 8,348,288 B1 * | 1/2013 | Laughon, Sr. | ........... | A61G 5/02 280/87.021 |
| 2002/0170588 A1 * | 11/2002 | Seo | ........................ | E04H 15/58 135/90 |
| 2005/0217665 A1 * | 10/2005 | Luconi | ...................... | F24J 2/16 126/696 |
| 2006/0033297 A1 * | 2/2006 | Miller | .................... | B62K 3/002 280/87.021 |
| 2008/0210221 A1 * | 9/2008 | Genschorek | ........... | F24J 2/5233 126/704 |
| 2010/0089390 A1 * | 4/2010 | Miros | .................... | F24J 2/5239 126/608 |
| 2010/0243034 A1 | 9/2010 | Hu et al. | | |
| 2010/0269447 A1 * | 10/2010 | Schuit | ................... | F24J 2/5205 52/698 |
| 2011/0088740 A1 | 4/2011 | Mittan et al. | | |
| 2011/0296773 A1 * | 12/2011 | Kellerman | ............. | F24J 2/5203 52/173.3 |
| 2012/0204935 A1 | 8/2012 | Meyer et al. | | |
| 2013/0011187 A1 * | 1/2013 | Schuit | ..................... | F16B 2/065 403/287 |
| 2013/0153520 A1 | 6/2013 | Mastroyiannis | | |

FOREIGN PATENT DOCUMENTS

| | | |
|---|---|---|
| EP | 2416088 A2 | 2/2012 |
| KR | 101110861 B1 | 2/2012 |
| WO | 2011046578 A1 | 4/2011 |
| WO | 2012021650 A2 | 2/2012 |
| WO | 2013085792 A2 | 6/2013 |

* cited by examiner

CARRIER STRUCTURE FOR SOLAR PANELS AND METHOD OF PRODUCING SUCH A CARRIER STRUCTURE

CROSS-REFERENCE TO RELATED APPLICATIONS

This application is the United States national phase of International Application No. PCT/NL2014/050775 filed Nov. 7, 2014, and claims priority to The Netherlands Patent Application No. 2011769 filed Nov. 8, 2013, the disclosures of which are hereby incorporated in their entirety by reference.

BACKGROUND OF THE INVENTION

The invention relates to a carrier structure for solar panels. The invention also relates to a beam for use in a carrier structure according to the invention. The invention then relates to a carrier for use in a carrier structure according to the invention. The invention furthermore relates to an assembly of at least one carrier structure and at least one solar panel. In addition, the invention relates to a method of producing a carrier structure according to the invention.

Fitting solar panels on a horizontal or slightly diagonal roof is achieved by using a carrier structure. Such carrier structures are known in various variant embodiments, wherein the carrier structures may, for example, be formed as a plastic carrier tray for carrying one or more solar panels. Such carrier trays are usually bulky and heavy, and therefore difficult to handle. It is also known to construct the carrier structure in modular fashion from several components which are attached to one another by means of screws or similar fastening elements. The advantage of such a modular structure is that it is easier to handle than the aforementioned carrier tray, but this is advantageous from a practical point of view. A drawback of this known modular system is the fact that it is relatively labor-intensive and therefore costly to construct the modular carrier structure. There is a need to simplify this installation process of modular carrier structures.

It is an object of the invention to fulfill this need.

BRIEF SUMMARY OF THE INVENTION

To this end, the invention provides a modular carrier structure of the type mentioned in the preamble, comprising at least one carrier frame configured for carrying at least a part of at least one solar panel, which carrier frame comprises: at least one substantially elongate beam, at least one first carrier which can be coupled to a first end of the elongate beam for supporting a part of at least one solar panel, and at least one second carrier which can be coupled to an opposite second end of the elongate beam for supporting a part of at least one solar panel, in particular a part of the at least one solar panel which is also carried by the first carrier, wherein the elongate beam and at least one carrier can be pushed into one another in order to form a pin-hole joint, in such a way that a part of the beam is secured in a peripheral side of the beam in substantially each lateral direction by the at least one carrier and/or in such a way that a peripheral side of the at least one carrier is secured in substantially each lateral direction by the at least one beam. By pushing the beam and at least one carrier, preferably both carriers, into one another in such a way that a pin-hole joint is produced in which one frame part secures the other frame part on all sides, in each direction, a connection between the beam and at least one carrier, preferably both carriers, can be achieved relatively quickly which, in addition, is relatively stable due to the peripheral securement. As a result thereof, the carrier structure according to the invention can be constructed relatively quickly and inexpensively. Securement in each lateral direction is understood to mean peripheral securement (360°), i.e. securement in substantially every direction which is substantially perpendicular to a longitudinal axis of at least an end of the beam. The lateral securement does not necessarily require the one frame part engaging with the entire periphery of the other frame part. In this case, there may be interruptions in the engagement, as a result of which it may even involve a point securement which fixes the secured frame part in the lateral direction. However, it is also conceivable for, for example, at least one carrier to be configured for substantially completely surrounding of the beam (or vice versa) in the lateral direction. In that case, the carrier engages with the entire periphery of the beam which may benefit the strength of the pin-hole joint.

In use, the beam is usually situated in a substantially horizontal plane or at least substantially parallel to the angle of inclination of a roof on which the carrier structure is arranged. This angle of inclination is usually 0° (horizontal orientation), but may also be slightly greater (<20°), with the inclination of the roof being limited. Each carrier is configured for directly or indirectly (by means of a further component, such as for example an adapter) carrying a part, usually a corner, of a solar panel. The first carrier and the second carrier are therefore configured for supporting different corners of a solar panel. Since it is usually desirable to direct the solar panels towards the sun, the solar panels will usually be placed at an angle of inclination, which is usually determined, in particular, by the design of the carrier structure, in particular the (different) heights of the carriers. This implies that the beam usually extends in a direction which encloses an angle (of inclination) with the solar panel situated above it. Since a solar panel is usually provided with four corners, each solar panel will usually be supported by four carriers, in particular two first carrier and two second carriers, wherein each first carrier is connected to each second carrier by a beam. Usually, it is not necessary to use an additional beam for connecting the first carriers to each other or for connecting the second carriers to each other, since the substantially rigid (dimensionally stable) solar panel situated above already fixes the carriers and beams situated underneath with respect to each other. Nevertheless, it is conceivable to also connect similar carriers to each other by means of one or more beams, preferably using an advantageous pin-hole joint similar to that which has already been described above.

The pin-hole joint may be single-sided or multi-sided, usually double-sided. The expression a single-sided pin-hole joint is understood to mean a connection between a single pin and a single hole, also referred to as receiving space. In the case of a multi-sided pin-hole joint, one or more pins cooperate with one or more holes. The direction in which the pin-hole joint extends may be from beam to carrier or vice versa. More particularly, it is conceivable for the beam to be provided with a receiving space for receiving a part of at least one carrier. However, it is also conceivable for at least one carrier to be provided with a receiving space for receiving a part of the beam, if desired in combination. Usually, this last embodiment, in which an end of the beam is inserted (pushed) into a receiving space of the carrier, will be preferred as this generally results in the strongest, simplest embodiment. In this case, it is advantageous if an outer periphery of the beam substantially corresponds to an inner periphery of the receiving space. In cross section, this design will usually be round, oval, angled or a combination thereof.

Preferably, the elongate beam is substantially tubular, for example in the shape of a hollow tube. The weight of such hollow profiles is relatively limited, which often benefits the handling and the cost price. Nevertheless, it is conceivable for a solid beam, such as bars, to be used, which may be advantageous, for example, if a particularly strong carrier structure is desired. Preferably, the beam is substantially dimensionally stable, which will benefit the ultimate strength of the carrier structure. Usually, the beam will be linear, but it is also conceivable to use a non-linear beam, such as an angled and/or curved beam. Often, the beams are made from plastic and/or metal, in particular aluminum.

Preferably, at least one carrier is configured to be coupled to several beams simultaneously. More preferably, the beams in this case extend in substantially the same direction. In this way, it is possible for the modular carrier structure to position and support a series of solar panels one behind the other in a relatively efficient way, wherein it is possible to form a circuit of (carrier-beam)$_n$-carrier, with n≥1. Which carriers (first carrier or second carrier) are connected up in which order depends on the specific circumstances and requirements. In this case, it is conceivable to position a solar panel above each beam. It is also conceivable for at least one carrier, preferably the at least one carrier which is configured to be coupled simultaneously to several beams, to be configured to simultaneously support several solar panels. In this case, the respective (multi)carrier may carry and support the solar panels at the same height, as a result of which, for example, a first solar panel could have a southern orientation (Z) and a second solar panel could have a northern orientation (N). However, it is also conceivable for the respective (multi)carrier to be configured to support different solar panels at different heights, as a result of which the solar panels could have a Z-Z or an N-N orientation. Obviously, an alternative orientation, for example an easterly (E) and/or westerly (W) orientation, is also conceivable.

In a preferred embodiment, at least one carrier is provided with at least one foot for resting the carrier on the surface beneath it. If desired, this foot may be displaceable, in particular tiltable and/or slidable, with respect to another part of the support, in order to be able to compensate for the thermal action of the solar panel and/or the carrier structure as such, so that it is ensured as much as possible that the carrier structure rests on the surface beneath it, in particular a substantially horizontal roof, in a stable manner.

By inserting (pushing) the beam into at least one carrier, which results in a strong pin-hole joint, no screws or similar fastening elements are necessary to be able to construct a strong carrier frame, and thus a strong carrier structure, which is particularly advantageous from a practical and a cost perspective. Nevertheless, it may be advantageous to provide the beam and/or at least one carrier with at least one locking element for locking the beam and at least one carrier in a coupled position. In this way, it is possible to prevent undesirable disconnection of the beam from the at least one carrier. In this case, it is for example conceivable for the beam and/or at least one carrier to be provided with a resilient lip configured for locking interaction with an edge or counterlip of an adjacent frame part (carrier and/or beam). In this case, the edge may be formed by an opening in the adjacent frame part. Disconnection can then only occur after the frame parts have been unlocked from each other, for example by actively deforming the resilient lip, in such a way that it is possible to pull the beam and the at least one carrier apart. It is conceivable that this mutual locking substantially fixes the frame parts—in the coupled and locked position—with respect to each other, not only in the lateral direction, but also in the axial direction (in the longitudinal direction of at least the end of the beam). However, it is usually advantageous in the case of the frame parts to allow a predetermined tolerance with respect to each other in the coupled and locked position. In this case, it is advantageous if the beam, in the coupled and locked position, can be displaced over a predetermined distance in the axial direction with respect to at least one carrier. This tolerance of a predetermined magnitude allows a certain thermal action of the solar panels and/or the carrier structure without increasing the material stresses in the carrier structure, thus benefitting the stability and durability of the carrier structure.

It is advantageous if the beam and at least one carrier are configured to be releasably coupled to each other. This makes it possible to disassemble the carrier structure and/or to replace a beam and/or carrier relatively easily.

The invention also relates to a beam for use in a carrier structure according to the invention, wherein the beam is substantially elongate, in particular tubular. In this case, the beam is preferably provided with at least one wall opening for interacting with a locking element of an adjacent carrier. Preferably, the beam is substantially angled, in particular rectangular, in cross section. Use of a beam which is angled in cross section prevents axial rotation of the beam in the coupled position, which benefits the strength of the carrier frame. Further advantages and variant embodiments of the beam have already been described in detail above.

The invention furthermore relates to a carrier for use in a carrier structure according to the invention. In this case, the carrier is preferably configured to rest on the surface beneath it, usually a substantially horizontal roof. Usually, it is provided with at least one receiving space for receiving part of a beam, wherein a part of the beam in a peripheral side of the beam is secured in substantially every lateral direction by the carrier. The carrier is preferably configured to couple several beams simultaneously and/or to support several solar panels simultaneously. Preferably, the carrier is made from plastic, since plastic is relatively inexpensive, lightweight and strong, and makes it possible to produce complicated carriers in a relatively simple manner. Obviously, it is conceivable to use materials other than plastic. Further advantages and variant embodiments of the carrier have already been described in detail above.

The invention furthermore relates to an assembly of at least one carrier structure according to the invention, and at least one solar panel. The solar panel may be clamped by the carrier frame of the carrier structure. It is also conceivable for the solar panel to be fixed with respect to the carrier structure, for example by means of screws. However, it is also conceivable for the solar panel to be placed loosely on the carrier structure.

In addition, the invention relates to a method of producing at least a part of a carrier structure according to the invention, comprising the following step: A) pushing at least one substantially elongate beam and at least one first carrier for supporting a part of at least one solar panel into one another, resulting in a pin-hole joint, in such a way that a part of the beam in a peripheral side of the beam is secured in substantially every lateral direction by the first carrier and/or in such a way that a peripheral side of the first carrier is secured in substantially every lateral direction by the at least one beam. Usually, the method also comprises the following step B) pushing at least one substantially elongate beam and at least one second carrier for supporting a part of at least one solar panel into one another, resulting in a pin-hole joint, in such a way that a part of the beam in a peripheral side of the beam is secured in substantially every lateral direction by the second carrier and/or in such a way that a peripheral side of the second carrier is secured in substantially every lateral direction by the at least one beam. The assembly of first carrier, beam, and second carrier, may optionally be expanded in modular fashion with further beams and carriers. Usually, each solar panel will be supported by two of the abovementioned assemblies, as a result of which the assemblies may optionally be coupled to one another by one or more (cross) beams. Further advantages and variant embodiments of the method have already been described in detail above.

BRIEF DESCRIPTION OF THE DRAWINGS

The invention will be explained with reference to the non-limiting exemplary embodiments illustrated in the following figures, in which.

DETAIL DESCRIPTION OF THE INVENTION

Figure 1:
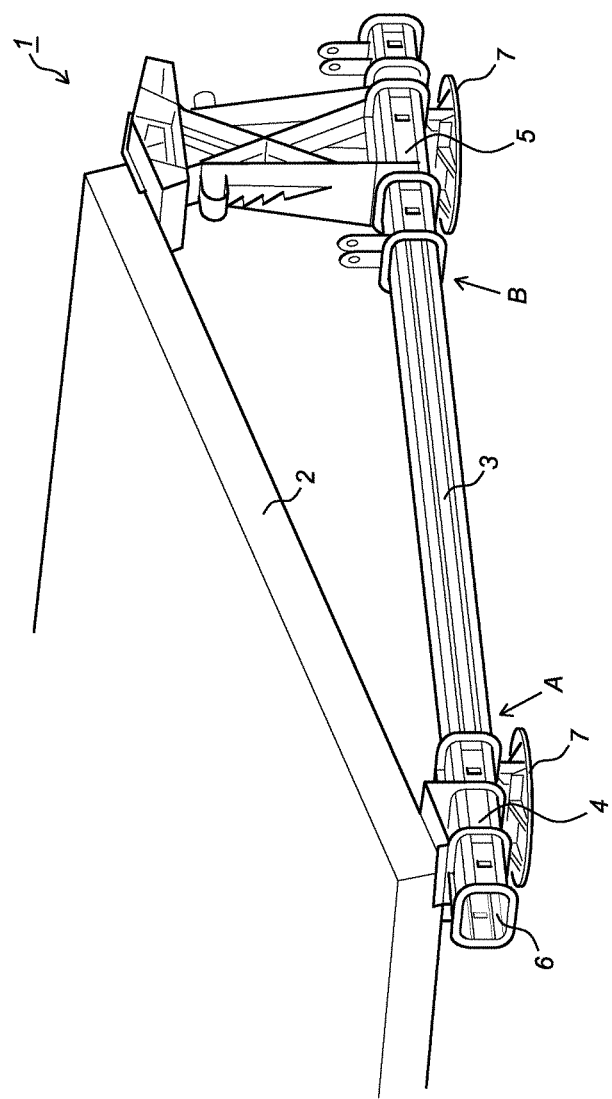
FIG. 1 shows a carrier structure for solar panels according to the invention.

FIG. 1 shows a carrier structure for solar panels according to the invention, comprising at least one carrier frame (1) configured for carrying at least a part of at least one solar panel (2), the carrier frame (1) comprising a substantially elongate beam (3), a first carrier (4) which is connected to a first end (A) of the elongate beam (3) for supporting a part of at least one solar panel (2), and a second carrier (5) connected to an opposite second end (B) of the elongate beam (3) for supporting a part of the at least one solar panel (2). The elongate beam (3) and a carrier (4, 5) are pushed into one another, producing a pin-hole joint, wherein a part of the beam (3) in a peripheral side of the beam (3) is secured in substantially every lateral direction by the carrier (4, 5). The (high) second carrier (5) is configured to support four solar panels, or at least corners thereof, simultaneously, two of which solar panels extend in a first direction (in for example a southern direction) and two of which solar panels extend in a second direction (for example northern orientation).

To this end, the carrier (4, 5) is provided with a receiving space (6) into which a part of the beam (3) fits. In order to ensure a good fit, the outer periphery of the part of the beam (3) substantially corresponds with the inner periphery of the receiving space (6) of the carrier (4, 5). However, it is also possible to provide the beam (3) with an opening into which a part of the carrier (4, 5) fits in order to achieve the same lateral securement.

The carriers (4, 5) are also provided with one or more optional feet (7) the carrier (4, 5) for resting on the surface beneath it.

Figure 2:
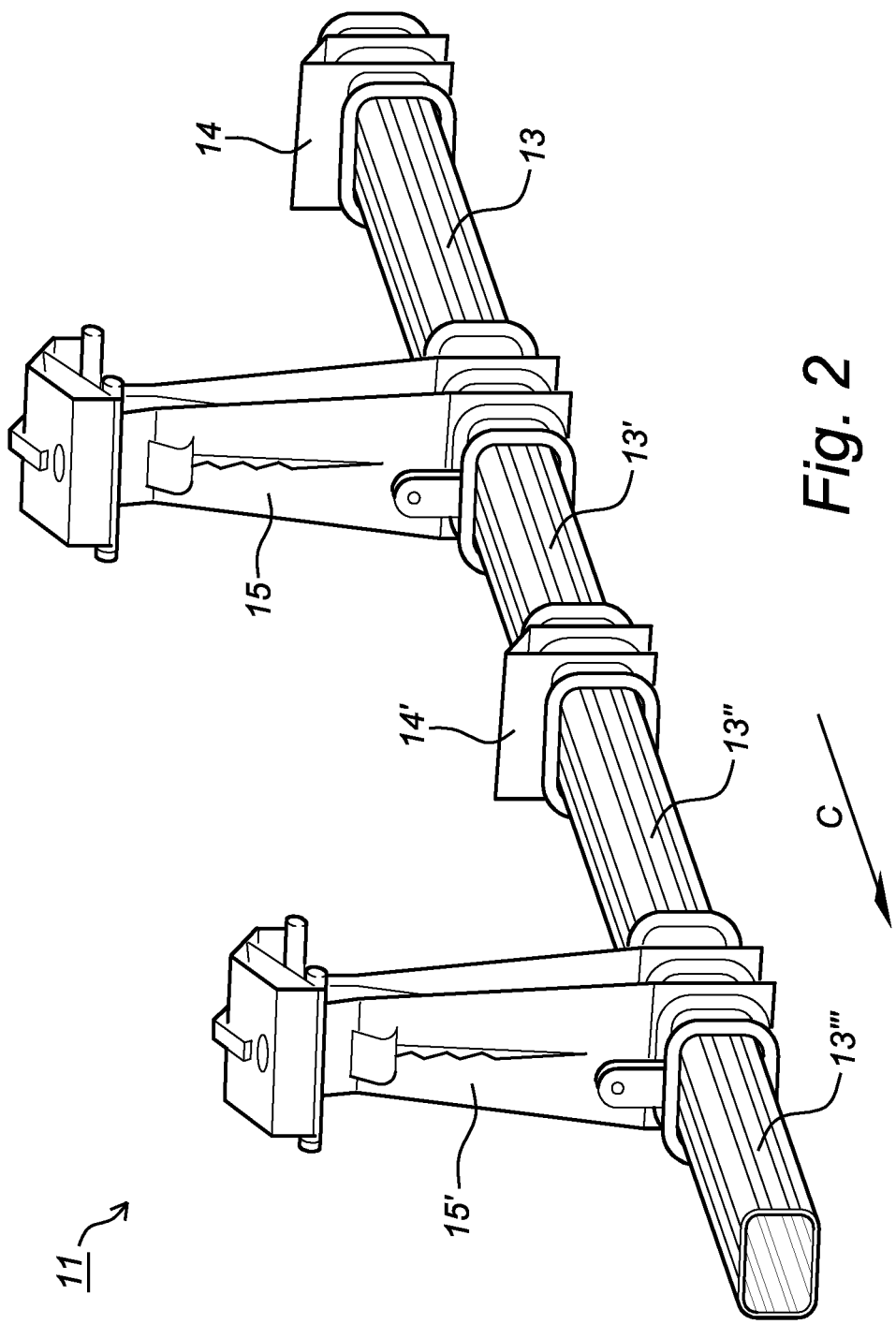
FIG. 2 shows a carrier frame according to the invention configured to carry at least a part of at least one solar panel.

FIG. 2 shows a carrier frame (11) configured to carry at least a part of at least one solar panel, in which the frame (11) comprises four beams (13, 13', 13", 13"'), and two first carriers (14, 14') and two second carriers (15, 15'). The carriers (14, 14', 15, 15') are configured to be coupled simultaneously to two beams (13, 13', 13", 13"'), in which the beams (13, 13', 13", 13"') extend in substantially the same direction (C). The beams may in this case be of different length. The carriers (14, 14', 15, 15') may also be provided with one or more feet, as is illustrated in FIG. 1.

Figure 3:
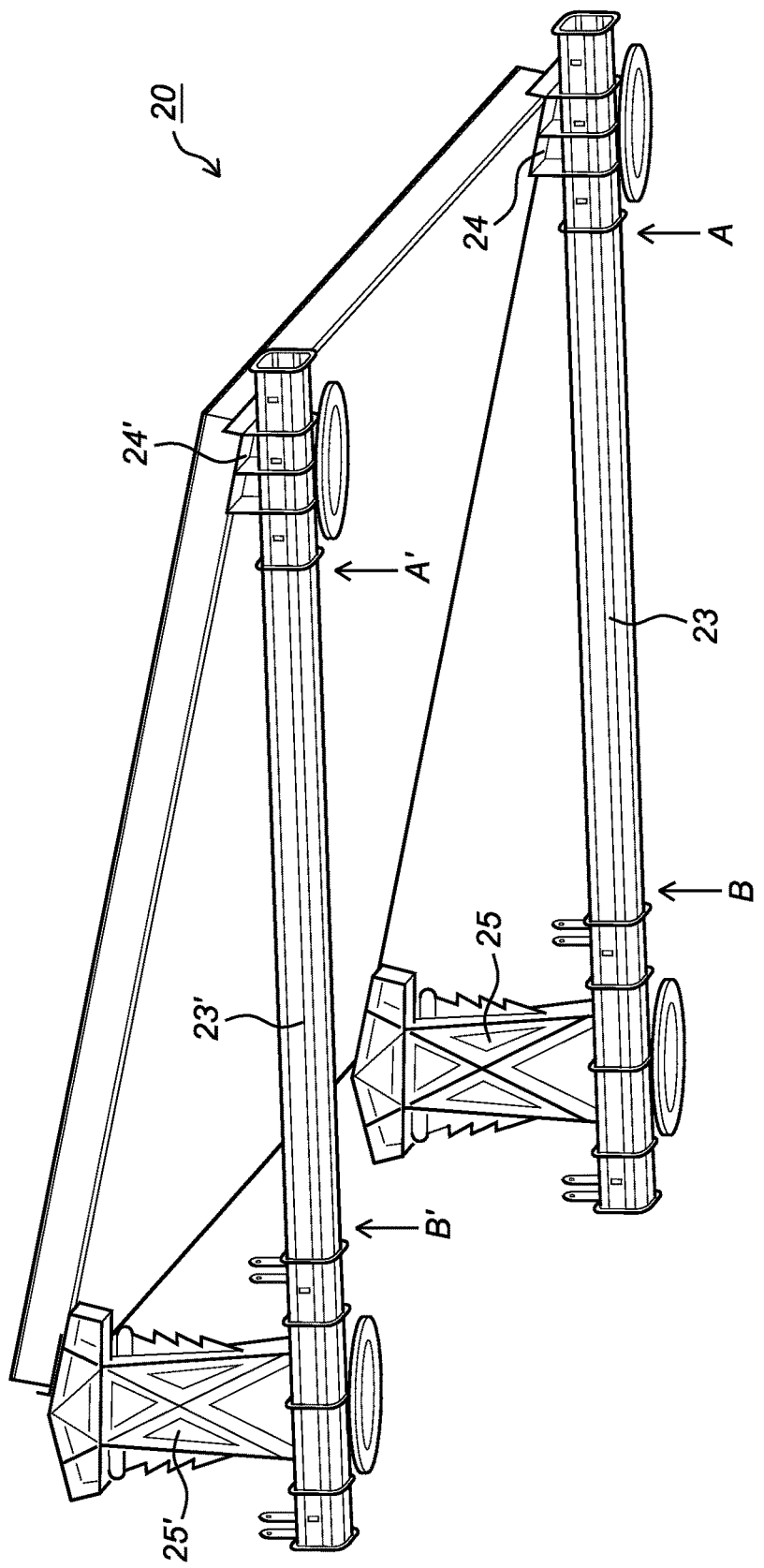
FIG. 3 shows a diagrammatic illustration of several carrier frames according to the invention.

FIG. 3 shows a diagrammatic view from below of a carrier structure (20) comprising a combination of a first assembly of an elongate beam (23), a first carrier (24) connected to a first end (A) of the elongate beam (23), and a second carrier (25) connected to an opposite second end (B) of the elongate beam (23), and a second assembly, positioned at a distance from the first assembly and comprising an elongate beam (23'), a first carrier (24') connected to a first end (A') of the elongate beam (23'), and a second carrier (25') connected to an opposite second end (B') of the elongate beam (23'). The carrier structure (20) is configured to support at least one complete solar panel (22). In FIG. 3, the solar panel (22) is supported at the four corners by the carriers (24, 24', 25, 25').

Figure 4A:
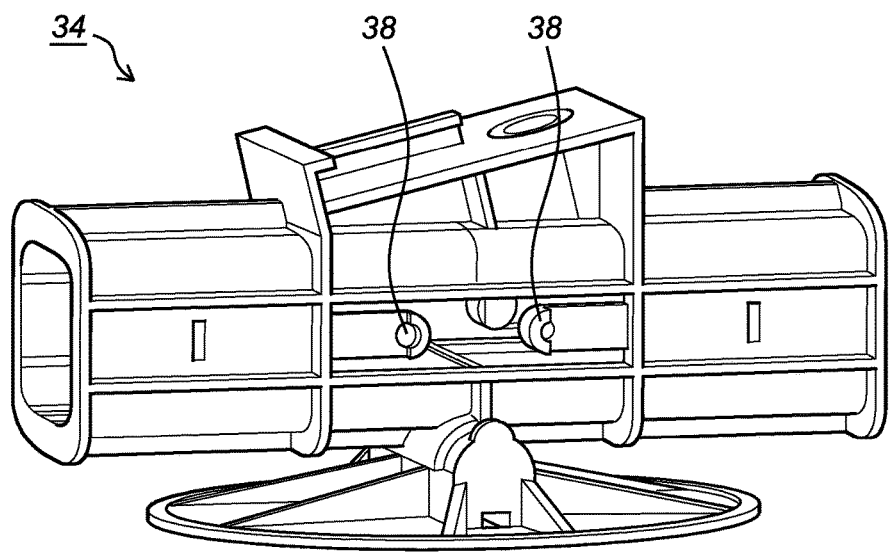
FIG. 4A shows a carrier for use in a carrier frame as illustrated in FIGS. 1. 2 and/or 3 provided with a locking element.

FIG. 4A shows a carrier (34) for use in a carrier frame as illustrated in FIGS. 1, 2 and/or 3, provided with a locking element (38), which is configured as a resilient lip (38). If a beam (33) (shown in FIG. 4B) is pushed into the carrier, the locking element can lock the beam in the carrier (34). The carrier is configured to support two solar panels, or at least the corners thereof, simultaneously.

Figure 4B:
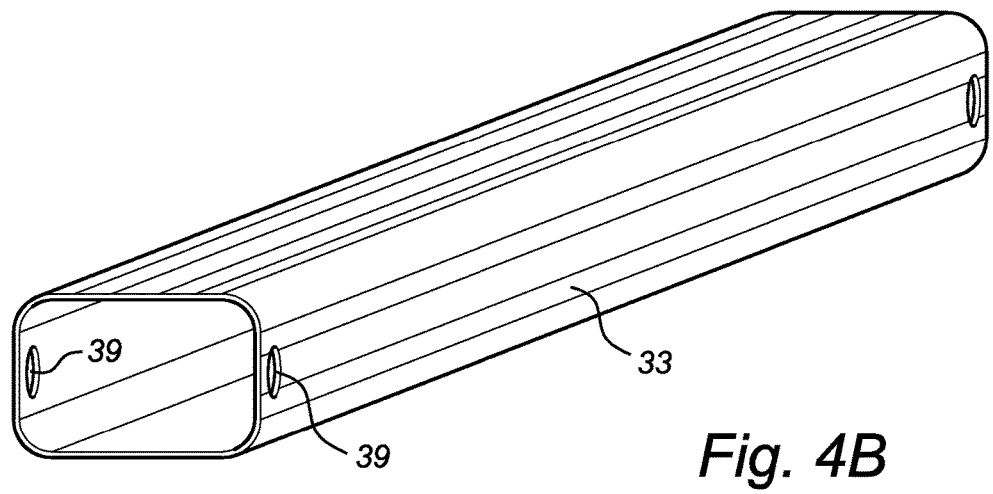
FIG. 4B shows a beam provided with an opening with an edge for use in a carrier frame as illustrated in FIGS. 1, 2 and/or 3 provided with a locking element.

FIG. 4B shows a beam (33), provided with an opening having an edge (39). If the beam (33) is pushed into the carrier (shown in FIG. 4A), the resilient lip (38) click-fits into the opening (39), as a result of which the carrier (34) and the beam (33) are locked with respect to each other and fixed with respect to each other. The lock may be dimensioned in such a way that there is a predetermined tolerance between the carrier (34) and the beam (33) with respect to each other in the coupled and locked position. Such a tolerance may be used, for example, to compensate for expansion and shrinking of the various parts due to temperature variations.

Figure 5:
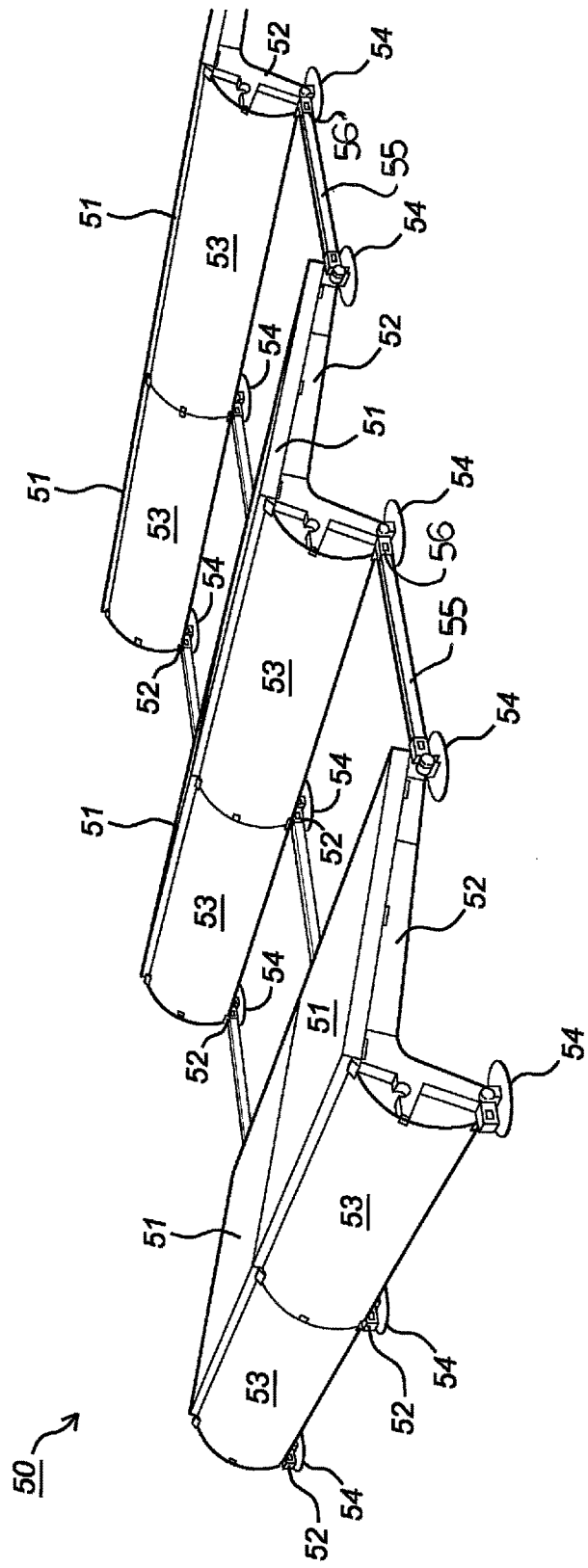
FIG. 5 shows a perspective view of an alternative carrier structure for solar panels according to the invention.

FIG. 5 shows a perspective view of an alternative carrier structure 50 for solar panels 51 according to the invention. The carrier structure comprises several L-shaped plastic carriers 52, in which each solar panel 51 is supported by two carriers 52. At least some carriers 52 are configured to support several solar panels 51, in particular two solar panels 51, simultaneously. The carriers 52 are made from plastic. The carriers 52 have an L-shaped design, as a result of which the solar panels 51 will be positioned at an angled orientation, usually in order to direct the solar panels 51 as much as possible in the direction of the sun. As is illustrated, the solar panels 51 are arranged on a longitudinal side of the L-shaped carriers 52. A more vertical short side of the carriers 52 is provided with a wind screen (wind guide) 53. Each carrier 52 is provided with several feet 54 which are, as such, tiltable and/or slidable with respect to the associated carrier 52, which facilitates positioning of the carrier 52 on an irregular (not flat) surface and/or compensating for the thermal action of the carrier structure 50. FIG. 5 shows three rows, each comprising two solar panels 51. The different rows are coupled to one another by means of beams 55. The beams 55 are in this case formed by tubular profiles, preferably made of metal, in particular aluminum. The ends of each beam 55 are inserted into a receiving space 56 which is provided in each carrier 52. In effect, each carrier 52 is provided with several receiving spaces 56 which are positioned a distance apart and are turned away from each other. This makes it possible to repeat a series of carrier 52 and beam 55, thus forming a relatively large carrier structure 50. As a rule, each receiving space 56 is provided with a resilient pin which, in the coupled position, cooperates with a hole provided in the beam 55, as a result of which the beam 55 is locked with respect to the carrier structure 50. In this exemplary embodiment, the first carrier and the second carrier are formed by the same carrier, as defined in the claims of this patent. Thus, the design and/or the size of the first carrier does not necessarily have to be different from the second carrier.

It will be clear that the invention is not limited to the exemplary embodiments illustrated and described here, but that many variants are possible which are obvious to the person skilled in the art and fall within the scope of the attached claims.

The invention claimed is:

1. A carrier structure for solar panels, comprising at least one carrier frame configured for carrying at least a part of at least one solar panel, which carrier frame comprises:
   at least one substantially elongate beam,
   at least one first carrier which can be coupled to a first end of the elongate beam for supporting a part of at least one solar panel, and
   at least one second carrier which can be coupled to an opposite second end of the elongate beam for supporting a part of at least one solar panel,
   wherein the elongate beam and at least one of the carriers can be pushed into one another in order to form a pin-hole joint, in such a way that a part of the beam is secured in a peripheral side of the beam in substantially each lateral direction by the at least one carrier and/or in such a way that a peripheral side of the at least one of the carriers is secured in substantially each lateral direction by the at least one beam,
   wherein at least one carrier is provided with at least one resilient lip configured for locking interaction with an edge or counterlip of the beam adjacent thereto and wherein the at least one carrier has a circumferential wall and the at least one resilient lip forms a part of the circumferential wall of the carrier.

2. The carrier structure as claimed in claim 1, wherein the beam is provided with a receiving space for receiving a part of at least one support.

3. The carrier structure as claimed in claim 1, wherein at least one of the carriers is provided with a receiving space for receiving a part of the beam.

4. The carrier structure as claimed in claim 3, wherein an outer periphery of the beam substantially corresponds to an inner periphery of the receiving space.

5. The carrier structure as claimed in claim 1, wherein at least one of the carriers is configured to substantially completely surround the beam in the lateral direction.

6. The carrier structure as claimed in claim 1, wherein the elongate beam is substantially tubular.

7. The carrier structure as claimed in claim 1, wherein at least one of the carriers is configured to be coupled to several beams simultaneously.

8. The carrier structure as claimed in claim 7, wherein the beams extend in substantially the same direction in the coupled position.

9. The carrier structure as claimed in claim 1, wherein at least one of the carriers is provided with at least one foot for resting the carrier on the surface beneath it.

10. The carrier structure as claimed in claim 1, wherein the carrier frame further comprises a combination of a first assembly of an elongate beam, at least one of the first carriers connected to a first end of the elongate beam, and at least one of the second carriers connected to an opposite second end of the elongate beam, and a second assembly of an elongate beam positioned at a distance from the first assembly, at least one of the first carriers connected to a first end of the elongate beam, and at least one of the second carriers connected to an opposite second end of the elongate beam, is configured to support at least one complete solar panel.

11. The carrier structure as claimed in claim 1, wherein an edge is formed by an opening in the adjacent frame part.

12. The carrier structure as claimed in claim 10, wherein each frame assembly is substantially fixed with respect to each other in the coupled and locked position.

13. The carrier structure as claimed in claim 10, wherein each frame assembly allows a predetermined tolerance with respect to each other in the coupled and locked position.

14. The carrier structure as claimed in claim 13, wherein the beam, in the coupled and locked position, can be displaced over a predetermined distance in the axial direction with respect to at least one of the carriers.

15. The carrier structure as claimed in claim 1, wherein the beam and at least one of the carriers are configured to be releasably coupled to each other.

16. The carrier structure as claimed in claim 1, wherein the first carrier is higher than the second carrier.

17. The carrier structure as claimed in claim 1, wherein at least one of the carriers is configured to support several solar panels simultaneously.

18. The carrier structure as claimed in claim 1, wherein the elongate beam is oriented substantially horizontally or at least substantially parallel to a roof supporting the carrier structure.

19. A carrier for use in a carrier structure as claimed in claim 1, wherein the at least one resilient lip is configured for locking interaction with an edge or counterlip of an adjacent elongate beam, and wherein the elongate beam and said carrier can be pushed into one another in order to form a pin-hole joint, in such a way that a part of the beam is secured in a peripheral side of the beam in substantially each lateral direction by said carrier and/or in such a way that a peripheral side of said carrier is secured in substantially each lateral direction by the at least one beam.

20. The carrier as claimed in claim 19, wherein the carrier is configured to rest on the surface beneath it.

21. The carrier as claimed in claim 19, wherein the carrier is provided with at least one receiving space for receiving a part of a beam, wherein a part of the beam in a peripheral side of the beam is secured in substantially every lateral direction by the carrier.

22. The carrier as claimed in claim 19, wherein the carrier is configured to couple several beams simultaneously.

23. The carrier as claimed in claim 19, wherein the carrier is configured to support several solar panels simultaneously.

24. An assembly of at least one carrier structure as claimed in claim 1 and at least one solar panel.

25. A method of producing at least a part of the carrier structure as claimed in claim 1, comprising the following step:
   A) pushing at least one substantially elongate beam and at least one first carrier for supporting a part of at least one solar panel into one another, resulting in a pin-hole joint, in such a way that a part of the beam in a peripheral side of the beam is secured in substantially every lateral direction by the first carrier and/or in such a way that a peripheral side of the first carrier is secured in substantially every lateral direction by the at least one beam, wherein the beam and at least one first carrier are locked in a coupled position by the resilient lip, being in locking interaction with an edge or counterlip of an adjacent frame part.

26. The method as claimed in claim 25, wherein the method also comprises the following step:

B) pushing at least one substantially elongate beam and at least one second carrier for supporting a part of at least one solar panel into one another, resulting in a pin-hole joint, in such a way that a part of the beam in a peripheral side of the beam is secured in substantially every lateral direction by the second carrier and/or in such a way that a peripheral side of the second carrier is secured in substantially every lateral direction by the at least one beam.

\* \* \* \* \*